United States Patent Office 3,657,339
Patented Apr. 18, 1972

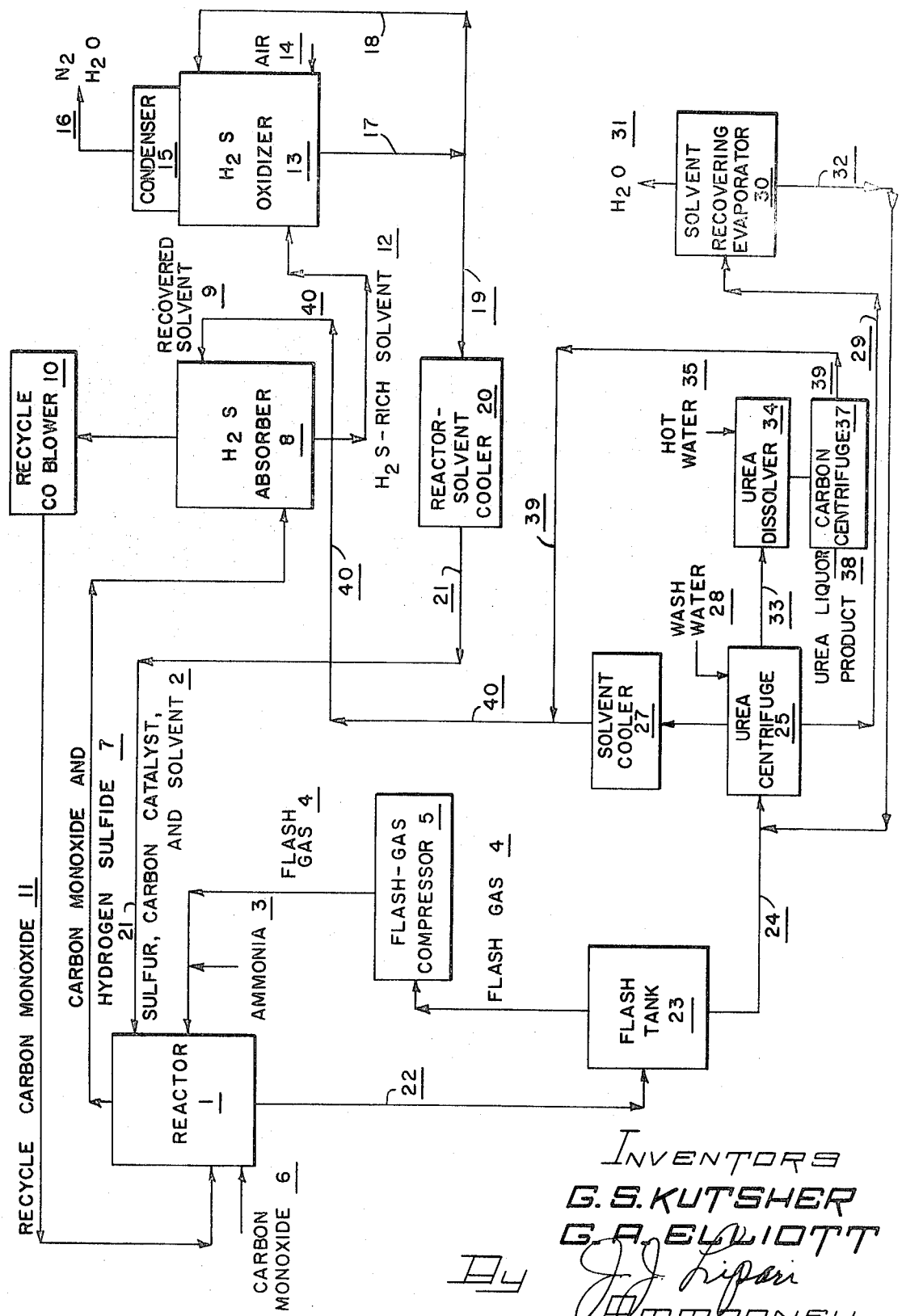

3,657,339
CONTINUOUS PROCESS FOR MAKING UREA
George S. Kutsher and George A. Elliott, Petersburg, Va., assignors to Allied Chemical Corporation, New York, N.Y.
Filed Sept. 26, 1969, Ser. No. 861,374
Int. Cl. C07c *127/00*
U.S. Cl. 260—555 S                    8 Claims

ABSTRACT OF THE DISCLOSURE

An improved solvent and process for making urea by reaction of ammonia, sulfur and carbon monoxide. The process involves the use of a reaction solvent comprising a mixture of dialkyl ethers of polyalkylene glycols having an average molecular weight between about 200 and about 400. By-product hydrogen sulfide is continuously stripped from the reaction mixture with excess carbon monoxide, absorbed in solvent recovered from the reaction product mixture, and oxidized to sulfur with an oxygen-containing gas in the presence of a carbon catalyst. The resulting sulfur-containing solvent mixture is recycled to the urea synthesis reaction. Thus, only carbon monoxide, ammonia and oxygen (air) are consumed in the overall process for production of urea.

BACKGROUND OF THE INVENTION

As is known, carbonyl sulfide and ammonia can be caused to react with each other to form ammonium thiocarbamate. It is also known that ammonium thiocarbamate can be converted into urea. Moreover, urea can be produced directly from carbonyl sulfide and ammonia without an isolation of ammonium thiocarbamate by causing the reaction to take place in the liquid phase, with or without a reaction solvent.

More recently, processes for urea have been disclosed wherein carbon monoxide, sulfur, and ammonia are reacted together, with the reaction preferably carried out in the presence of a solvent such as methanol. In one such process, it is indicated that the reactants may be fed to the base of a packed column, and urea in solution is removed from the top of the column and separated. In another such process, ammonia and sulfur dissolved in solvent are introduced into a plate column at a point so as to flow countercurrent to a stream of carbon monoxide introduced at the base of the column. Hydrogen sulfide and excess carbon monoxide are vented through a recovery zone at the top of the column, and urea is recovered from the solvent mixture removed from the bottom of the column.

From the foregoing, it would appear that research in this field of urea production is in an advanced stage of development. However, none of these prior art processes involving consumption of sulfur produces urea economically, as compared with presently used commercial processes involving the reaction of ammonia and carbon dioxide under high pressure and temperature. Accordingly, an improved process which avoids the costly consumption of sulfur is very desirable.

SUMMARY OF THE INVENTION

In a continuous process for the production of urea wherein carbon monoxide is continuously countercurrently reacted in a urea synthesis zone with ammonia and sulfur contained in an inert solvent, continuously removing a reaction product mixture containing urea from the urea synthesis zone and recovering urea from the reaction product mixture, the improvement which includes:

(a) Utilizing as inert solvent for the urea synthesis a mixture of dialkyl ethers of polyalkylene glycols having an average molecular weight between about 200 and about 400;

(b) Stripping hydrogen sulfide continuously from the urea synthesis mixture with excess carbon monoxide to form a gaseous mixture containing hydrogen sulfide and carbon monoxide;

(c) Continuously absorbing the hydrogen sulfide from the gaseous mixture containing hydrogen sulfide and carbon monoxide in inert solvent recovered from the reaction product mixture;

(d) Continuously oxidizing the hydrogen sulfide in the inert solvent with an oxygen-containing gas in the presence of a suspended carbon catalyst to form a slurry containing sulfur, carbon catalyst and inert solvent;

(e) Continuously passing the slurry containing sulfur, carbon catalyst and inert solvent to the urea synthesis zone, wherein the sulfur is reacted with added ammonia and carbon monoxide to form urea;

(f) Continuously removing from the urea synthesis zone a reaction product mixture containing primarily urea, carbon catalyst and inert solvent;

(g) Separating the inert solvent from the urea and carbon catalyst in the reaction product mixture for recycle of the inert solvent to step (c); and (h) Recovering urea from the resultant urea and carbon catalyst mixture.

Unexpectedly, the improved solvent of the present invention is stable not only in the urea synthesis reaction but also under the oxidation conditions existing during the conversion of the hydrogen sulfide to sulfur. Moreover, the instant solvent is a very excellent solvent for recovery of the hydrogen sulfide stripped from the urea production zone. Further, the solvent has low volatility, thereby rendering solvent losses in the process negligible.

BRIEF DESCRIPTION OF THE DRAWING

The accompanying drawing is a diagrammatic flow sheet illustrating one method of practicing the present invention.

DESCRIPTION OF THE PREFERRED EMBODIMENT

The preferred solvent composition of the instant invention is essentially a mixture of dimethyl ethers of polyethylene glycols of the formula $$CH_3O(C_2H_4O)xCH_3$$

wherein $x$ is between 3 and 9, and the average molecular weight is between 220 and 305. The homolog distribution is approximately as follows:

Homolog distribution, 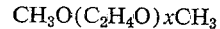

| $x$: | Molecular homolog, wt. percent |
|---|---|
| 3 | 4–9 |
| 4 | 22–24 |
| 5 | 24–28 |
| 6 | 20–22 |
| 7 | 13–15 |
| 8 | 6–8 |
| 9 | 2–4 |

Minor amounts of lower and higher homologs may be tolerated; specifically, the percent homolog where $x$ is less than 3 shall not exceed 1%, desirably less than 0.5%, and where $x$ is greater than 9 shall not exceed 3%, desirably less than 1%.

The instant solvent composition has a vapor pressure less than 0.01 mm. Hg at temperatures up to 110° F. and a viscosity of between 5 and 10 centipoises, usually between 7.5 and 8.5 centipoises, at about 15° C.

It has been discovered that hydrogen sulfide may be dissolved in the solvent composition under superatmospheric pressure to lower the viscosity as discussed hereinafter.

The mixture of dimethyl ethers of polyethylene glycols of the present invention is prepared from the corresponding monomethyl ethers of polyethylene glycols by reacting the monomethyl ether with sodium to form the sodium alcoholate thereof, reacting the sodium alcoholate with methyl chloride to form the dimethyl ethers and sodium chloride, and separating the sodium chloride from the dimethyl ethers. Preferably, about 0.1-0.6 weight percent of water is incorporated in the monomethyl ethers, and the reaction temperature is maintained at about 100-120° C.

The mixture of monomethyl ethers of polyethylene glycols from which the diethers are derived may be prepared from ethylene oxide and methanol. About 4.5 mols of ethylene oxide is reacted with 1 mol of methanol at about 110-140° C. using sodium hydroxide as catalyst. The resulting product is distilled at about 10 mm. Hg pressure to remove all of the low-boiling compounds, together with most of the monomethyl ether of triethylene glycol. The residue is suitable for preparation of the dimethyl ethers of the present invention as previously described.

An example of the important physical properties of the preferred solvent composition are listed below:

| | |
|---|---|
| Vapor pressure, 25° C., mm. Hg | <0.01 |
| Viscosity, 15° C., cp. | 8.3 |
| Viscosity, 33° C., cp. | 4.7 |
| Specific heat, 5° C. | 0.49 |
| Freezing point, ° C. | −25 |
| Pounds per gallon, 25° C. | 8.6 |

It was found that dissolved hydrogen sulfide lowers the viscosity of the instant solvent to about 1-5 centipoises depending on the partial pressure of the hydrogen sulfide and the temperature. The effect of dissolved hydrogen sulfide on viscosity of the solvent is indicated in the following table:

| | Temperature, ° C. | Viscosity, centipoises |
|---|---|---|
| Partial pressure of H₂S over solution, p.s.i.a.: | | |
| 0 | 15 | 8.3 |
| 0 | 33 | 4.7 |
| 132 | 33 | 1.0 |

An important effect of this reduced viscosity is to improve absorber efficiency when the absorber is operated at preferred pressures of about 175-500 p.s.i.g. Desirably, the solvent in the absorber should contain 1-10% $H_2S$ based on the total weight of the mixture.

Hereinafter, for convenience, the preferred solvent of the present invention will be called DMPEG solvent.

Referring to the drawing, the urea synthesis is conducted in a vertical reactor 1, preferably a perforated plate column having 10-25 sieve trays, by countercurrently contacting a slurry of sulfur and carbon catalyst in DMPEG solvent with ammonia and carbon monoxide at 175-500 p.s.i.g. and 90-125° C. The DMPEG solvent containing sulfur and carbon catalyst 2 is fed to the top of reactor 1 through line 21. The ammonia 3 is fed to the middle section of reactor 1, together with recovered flash gas 4 from the flash-gas compressor 5. Carbon monoxide 6 is introduced to the bottom section of reactor 1.

Reaction of carbon monoxide with sulfur and ammonia occurs in the middle section of the reactor to form urea according to the following overall equation:

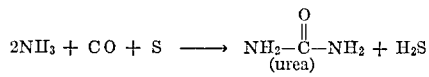
$$2NH_3 + CO + S \longrightarrow NH_2-\overset{O}{\underset{\|}{C}}-NH_2 + H_2S$$
(urea)

The ammonia and sulfur are preferably fed to the reactor in about stoichiometric amounts, whereas carbon monoxide is preferably fed at 1.1-2.0 times the stoichiometric amount.

By-product hydrogen sulfide is carried to the top of reactor 1 by the excess carbon monoxide and is scrubbed essentially free of ammonia by the incoming DMPEG-sulfur-carbon slurry fed to the top of reactor. The gaseous mixture of carbon monoxide and hydrogen sulfide 7 exits the top of reactor 1 and is fed to the bottom section of hydrogen sulfide absorber 8.

The hydrogen sulfide absorber 8 is preferably a vertical column having about 10-40 plates. Operating pressure is preferably about 175-500 p.s.i.g. Recovered DMPEG solvent 9 is fed from solvent cooler 27 through line 40 to the top of the column at about 1.0-4.5 pounds of solvent per standard cubic foot of hydrogen sulfide to be absorbed, preferably at a temperature of 20-50° C. Essentially all of the hydrogen sulfide in the feed gas is absorbed in the absorber. Normally, the carbon catalyst used in the oxidation step of the process is mixed with the DMPEG solvent fed to hydrogen sulfide absorber 8, but the catalyst may be added to the oxidation step, if desired. A carbon monoxide stream 11 is recycled from the top of the hydrogen sulfide absorber 8 through recycle blower 10 to the bottom section of the urea synthesis reactor 1. Hydrogen sulfide-rich solvent 12 is fed from the base hydrogen sulfide absorber 8, normally containing about 1 weight percent carbon catalyst, to hydrogen sulfide oxidizer 13.

The hydrogen sulfide oxidizer 13 preferably is a vertical vessel about 20-60 feet tall equipped with conventional cooling means. Temperature in the oxidizer is preferably maintained at about 140-170° C. The $H_2S$-solvent feed is to an intermediate section of the vertical vessel; pressure at the top of the vessel is approximately atmospheric. Sufficient air 14 is fed to the oxidizer to oxidize the hydrogen sulfide to sulfur in accordance with the following equation:

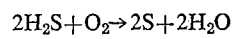
$$2H_2S + O_2 \rightarrow 2S + 2H_2O$$

Sulfur is carried downward with the suspended carbon catalyst by the DMPEG solvent and steam is carried to the top of the reactor by nitrogen from the air. Steam is partially condensed in condenser 15 and refluxed as a means to prevent solvent loss. The nitrogen and water vapor is vented through line 16. Heat of reaction in the hydrogen sulfide oxidizer 13 is removed by internal cooling coils and a water jacket, not shown.

Solvent containing sulfur and carbon catalyst is taken from the bottom of hydrogen sulfide oxidizer 13 through line 17 and split into two parts. A major portion is pumped to the top section of hydrogen sulfide oxidizer 13 through line 18. The other part is pumped through line 19 to reactor-solvent cooler 20 where it is cooled to about 70-80° C., then through line 21 to the top section of reactor 1.

A slurry of urea in DMPEG solvent containing carbon catalyst leaves the bottom of reactor 1 through line 22 and is fed to flash tank 23 which is operated at about 0-10 p.s.i.g. Flash gas 4 containing ammonia and hydrogen sulfide is sent to flash-gas compressor 5 for return to reactor 1. The residual slurry is pumped through line 24 to the urea centrifuge 25 to separate the DMPEG solvent from the urea-carbon catalyst mixture. The separated solvent is pumped through line 26 to solvent cooler 27 where it is cooled to 20-50° C., and pumped through line 40 to hydrogen sulfide absorber 8.

The urea-carbon catalyst mixture separated in urea centrifuge 25 is washed with a small proportion of wash water 28 to remove residual solvent, and the washings are sent through line 29 to solvent recovery evaporator 30 where water 31 is removed as vapor. The residual solvent containing a small amount of urea is reutrned to urea centrifuge 25 through line 32.

The solid urea-carbon catalyst mixture from the urea centrifuge 25 is passed through line 33 to urea dissolver 34 where it is mixed with hot water 35 to form a urea solution. The mixture of carbon catalyst and urea solution is passed through line 36 to carbon centrifuge 37 where the caron catalyst is separated from the urea liquor product 38. The recovered carbon catalyst is fed through line 39 into a stream of recovered solvent in line 40.

The invention will be described further in conjunction with the following example which is not intended to be limitative in nature.

EXAMPLE I

This example is described with reference to the drawing. The process is essentially continuous with recycle of several liquid and gas streams.

The urea reactor is a vertical perforated plate column, 4 feet in diameter and 36 feet tall, having 15 sieve trays on 2-foot spacing. Internal cooling coils are used on the middle 5 trays.

A slurry of sulfur and activated carbon in DMPEG solvent is continuously charged to the top portion of the urea synthesis reactor. This slurry is a recycle stream from the reactor solvent cooler and has the following composition in pounds per minute:

| | |
|---|---|
| DMPEG solvent | 1377 |
| S | 90 |
| C | 14 |
| Urea | 43 |
| $H_2O$ | 2 |

Ammonia is fed to the middle section of the reactor together with flash gas from the flash gas compressor. The combined feed stream has the following composition in pounds per minute:

| | |
|---|---|
| $NH_3$ | 103 |
| $H_2S$ | 15 |

Carbon monoxide gas is fed to the bottom of the reactor at 80 pounds per minute with gas from the recycle carbon monoxide blower. The combined gas stream has the following composition in pounds per minute:

| | |
|---|---|
| CO | 104 |
| $NH_3$ | 1 |
| $H_2S$ | 1 |

Reaction of carbon monoxide with sulfur and ammonia occurs in the middle section of the reactor to form urea and hydrogen sulfide. Temperature in the reactor is maintained at about 90° to 110° C. by cooling, and pressure is maintained at about 250 p.s.i.g. Gas exit the top of the reactor has the following composition in pounds per minute:

| | |
|---|---|
| $H_2S$ | 97 |
| CO | 24 |
| $NH_3$ | 1 |

A solvent-urea slurry containing activated carbon catalyst leaves the bottom of the reactor. This slurry has the following composition in pounds per minute:

| | |
|---|---|
| DMPEG solvent | 1377 |
| Urea | 211 |
| S | 1 |
| $H_2O$ | 2 |
| $NH_3$ | 5 |
| $H_2S$ | 15 |
| C | 14 |

This stream is fed to the flash tank which operates at about 2 p.s.i.g. Flash gas containing ammonia and $H_2S$ is sent to the flash gas compressor. The residual slurry, at about 100° C., is fed to the urea centrifuge to separate the DMPEG solvent from the urea-carbon catalyst mixture. The separated solvent is cooled to about 40° C. in the solvent cooler.

About 0.1 pound of water per pound of urea is used to wash the solid urea on the centrifuge free of DMPEG solvent. Dissolved urea and DMPEG solvent are recovered from the washings by evaporation of water in the solvent recovery evaporator and recycled to the urea centrifuge as part of the feed stream.

The solid urea-carbon catalyst mixture from the urea centrifuge is mixed with hot water to form a 70 percent urea solution. The carbon catalyst is then separated from the aqueous urea. The recovered carbon catalyst is fed into a stream of recovered DMPEG solvent from the solvent cooler and the mixture is fed to the top of the $H_2S$ absorber.

The $H_2S$ absorber is a vertical column having 20 trays on 18-inch spacing, about 3 feet in diameter. Solvent feed is about 1439 pounds per minute at 40° C. Operating pressure is about 250 p.s.i.g. Overhead gas from the urea reactor is fed to the base of the $H_2S$ absorber. Carbon monoxide stream from top of the $H_2S$ absorber is recycled to the base of the urea reactor. The liquid stream from the base of the $H_2S$ absorber has the following composition in pounds per minute:

| | |
|---|---|
| DMPEG solvent | 1377 |
| S | 1 |
| $H_2O$ | 4 |
| Urea | 43 |
| $H_2S$ | 96 |
| C | 14 |

The $H_2S$-rich solvent from the $H_2S$ absorber enters the $H_2S$ oxidizer where it contacts air at a maximum temperature of about 170° C. The $H_2S$ oxidizer is a vertical vessel, 7 feet in diameter and 40 feet tall, equipped with internal cooling coils in a water jacket for cooling. The solvent feed is at a side entry about 15 feet from the base. Air enters the base of the column at 209 pounds per minute. Solvent containing S is taken from the column and split into two parts. One part, about 100 gallons per minute is recycled to the top portion of the $H_2S$ oxidizer. The other part is cooled to about 75° C. in the reactor solvent cooler and is then fed to the top of the urea reactor. Off-gas from the top of the $H_2S$ oxidizer is mainly nitrogen and water vapor, and may be vented to the atmosphere.

Yield of urea is about 97 percent of theory, based on ammonia, and carbon monoxide fed to the process. Space-time yield in this example is about 168 pounds per minute in a urea reactor 4 feet in diameter and 36 feet tall.

We claim:

1. In a continuous process for the production of urea wherein carbon monoxide is continuously counter-currently reacted in a urea synthesis zone with ammonia and sulfur contained in an inert solvent, continuously removing a reaction product mixture containing urea from the urea synthesis zone and recovering urea from the reaction product mixture, the improvement which comprises:

(a) utilizing as inert solvent for the urea synthesis a mixture of dialkyl ethers of polyalkylene glycols having an average molecular weight between about 200 and about 400;

(b) stripping hydrogen sulfide continuously from the urea synthesis mixture with excess carbon monoxide to form a gaseous mixture containing hydrogen sulfide and carbon monoxide;

(c) continuously absorbing the hydrogen sulfide from the gaseous mixture containing hydrogen sulfide and carbon monoxide in inert solvent recovered from the reaction product mixture;

(d) continuously oxidizing the hydrogen sulfide in the inert solvent with an oxygen-containing gas in the presence of a suspended carbon catalyst to form a slurry containing sulfur, carbon catalyst, and inert solvent;

(e) continuously passing the slurry containing sulfur, carbon catalyst and inert solvent to the urea synthesis zone, wherein the sulfur is reacted with added ammonia and carbon monoxide to form urea;

(f) continuously removing from the urea synthesis zone a reaction product mixture containing primarily urea, carbon catalyst and inert solvent;

(g) separating the inert solvent from the urea and carbon catalyst in the reaction product mixture for recycle of the inert solvent to step (c); and (h) recovering urea from the resultant urea and carbon catalyst mixture.

2. The process according to claim 1 wherein the inert solvent of step (a) is a mixture of dimethyl ethers of polyethylene glycols.

3. The process according to claim 2 wherein the mixture of dimethyl ethers of polyethylene glycols has the general formula $CH_3O(C_2H_4O)xCH_3$ wherein $x$ is 3–9 and the molecular homolog distribution in terms of $x$ is:

| $x$: | Molecular homolog, wt. percent |
|---|---|
| 3 | 4–9 |
| 4 | 22–24 |
| 5 | 24–28 |
| 6 | 20–22 |
| 7 | 13–15 |
| 8 | 6–8 |
| 9 | 2–4 |

4. The process according to claim 3 wherein the urea synthesis zone is maintained at 90–125° C. and 175–500 p.s.i.g. and carbon monoxide is fed in excess over the stoichiometric amount.

5. The process according to claim 4 wherein the hydrogen sulfide is absorbed in step (c) at 20–50° C. and 175–500 p.s.i.g., and about 1.0–4.5 pounds of solvent is used per standard cubic foot of hydrogen sulfide to be absorbed.

6. The process according to claim 5 wherein the hydrogen sulfide is oxidized in step (d) with air at about 140–170° C.

7. The process according to claim 6 wherein the inert solvent is separated in step (g) by centrifugation.

8. The process according to claim 7 wherein the urea is recovered in step (h) by dissolving the urea in water, and separating the aqueous urea from the carbon catalyst.

References Cited

UNITED STATES PATENTS

| | | | |
|---|---|---|---|
| 3,516,793 | 6/1970 | Renault | 23—225 R |
| 2,857,431 | 10/1958 | Glass et al. | 260—555 R |
| 2,781,863 | 2/1957 | Bloch et al. | 23—225 RX |
| 2,692,656 | 10/1954 | Berg | 23—225 RX |
| 2,662,859 | 12/1953 | Kirkpatrick | 260—615 BX |
| 2,040,910 | 5/1936 | Zellhoefer | 260—615 BX |

FOREIGN PATENTS 214,519  10/1956  Australia _____ 260—555 S

LEON ZITVER, Primary Examiner

M. W. GLYNN, Assistant Examiner

U.S. Cl. X.R.

260—615 B; 23—225 R